United States Patent
Kaidar et al.

(10) Patent No.: US 12,497,876 B1
(45) Date of Patent: Dec. 16, 2025

(54) THERMAL RESPONSIVE FLUID INJECTION METHOD

(71) Applicant: SAUDI ARABIAN OIL COMPANY, Dhahran (SA)

(72) Inventors: Ziyad Faisal Kaidar, Riyadh (SA); Zuhair AlYousef, Saihat (SA); Mustafa Redha Satrawi, Riyadh (SA); Muhammad M. Almajid, Qatif (SA); Muhammad B. Otaibi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 19/037,972

(22) Filed: Jan. 27, 2025

(51) Int. Cl.
| | | |
|---|---|---|
| *E21B 33/13* | (2006.01) | |
| *E21B 33/138* | (2006.01) | |
| *E21B 43/24* | (2006.01) | |

(52) U.S. Cl.
CPC ........ *E21B 43/2405* (2013.01); *E21B 33/138* (2013.01)

(58) Field of Classification Search
CPC .......................... E21B 33/138; E21B 43/2405
USPC ...................................................... 166/272.1
See application file for complete search history.

(56) References Cited

U.S. PATENT DOCUMENTS

| | | | |
|---|---|---|---|
| 9,803,133 B2 * | 10/2017 | Al-Nakhli ............... | E21B 43/25 |
| 10,151,186 B2 * | 12/2018 | Al-Nakhli ............. | E21B 43/267 |
| 2013/0180720 A1 * | 7/2013 | Al-Dahlan ............... | C09K 8/72 |
| | | | 507/213 |
| 2015/0300142 A1 * | 10/2015 | Al-Nakhli ................ | C09K 8/52 |
| | | | 166/280.1 |
| 2021/0380866 A1 * | 12/2021 | Kaidar ................... | C09K 8/588 |

OTHER PUBLICATIONS

Amer Al-Anazi et al. "Modeling Gelation Time of Organically Crosslinked Polyacrylamide GelSystem for Conformance Control Applications", Society of Petroleum Engineers, Oct. 2019, pp. 1-16.

Felipe J. S. Bispo et al., "Controlling Nitrogen Oxide (NOx) Emissions from Exothermic Nitrogen Generation Systems for Application in Subsea Environments", ACS OMEGA, Dec. 2019, 21985-21992.

Zakiah Jamingan et al., "Sago Starch Based Hydrogel Prepared Using Electron Beam Irradiation Technique for Controlled Release Application", The Malaysian Journal of Analytical Sciences, Apr. 2015, pp. 503-512.

* cited by examiner

*Primary Examiner* — William D Hutton, Jr.
*Assistant Examiner* — Ashish K Varma
(74) *Attorney, Agent, or Firm* — Leason Ellis LLP

(57) ABSTRACT

Methods and associated systems for reducing permeability of fractures in deep underground formations are provided. Thermal responsive fluid is used that transitions to a gel upon exposure to heat generated by one or more subsequently added exothermic reactants. Exothermic reaction is utilized to control the temperature at the targeted stratum to and affect the gelation time and gel propagation in the porous medium.

17 Claims, 7 Drawing Sheets

THERMAL RESPONSIVE FLUID INJECTION METHOD

BACKGROUND

High permeability channels such as fractures in matrix-rock reservoir increase challenges in oil and gas recovery. These include excess water production and unrecovered hydrocarbons. Isolation techniques are used to decrease permeability of fracture-containing high permeability areas. The present disclosure addresses these challenges by providing heretofore unavailable methods for reducing permeability of high permeability channels.

SUMMARY

Methods for reducing permeability of high permeability channels are provided. According to a first implementation, a method for blocking fractures in a fracture zone including fractures and adjacent sand faces, comprising: introducing a thermal responsive fluid comprising a *Cycas revoluta* sago into fractures of the fracture zone; introducing exothermic reactants via separate conduits to sand faces adjacent to fractures having the thermal responsive fluid; mixing the exothermic reactants in the fracture zone at (a) a catalyzing temperature of at least about 60° C., and/or (b) a catalyzing pH of at least about 4, thereby catalyzing an exothermic reaction between exothermic reactants; wherein heat generated by the exothermic reaction between the exothermic reactants induces gelation of at least a portion of the *Cycas revoluta* sago within fractures of the fracture zone, thereby blocking the fractures.

According to a second implementation based on the first implementation, the thermal responsive fluid and the exothermic reactants are aqueous based.

According to a third implementation based on any of the first or second implementations, the exothermic reactants comprise an ammonium chloride solution and a sodium nitrite solution.

According to a fourth implementation based on any of the first, second or third implementations, the fractures are in high permeability channels.

According to a fifth implementation based on any of the first, second, third or fourth implementations, the fracture zone comprises a low temperature reservoir and is characterized by a temperature in the range of about 20-100, 20-90 60-100, 60-90, or 20-60° C. According to a sixth implementation based on the fifth implementation, the fracture zone is at depth of about 200-4000 or 300-3050 meters.

According to a seventh implementation based on any of the first, second, third, fourth, fifth or sixth implementations, the exothermic reactants are injected into an area of the fracture zone adjacent to an injection location of the thermal responsive fluid in the fracture zone.

According to an eighth implementation based on any of the first, second, third, fourth, fifth, sixth or seventh implementations, mixing exothermic reactants in the fracture zone occurs at a catalyzing temperature of at least about 60° C.

According to a ninth implementation based on any of the first, second, third, fourth, fifth, sixth, seventh or eighth implementations, mixing exothermic reactants in the fracture zone occurs at a catalyzing pH of at least about 4.

According to a tenth implementation based on any of the first, second, third, fourth, fifth, sixth, seventh, eighth or ninth implementations, the thermal responsive fluid is aqueous based and has a sago concentration in the range of about 0.1-10, 1-10, 2-10, 3-10, 3.5-10, 4-10, or 4.5-10 weight percent. According to an eleventh implementation based on the tenth implementation, water for the aqueous based fluid has a salt concentration of 0 up to about 0.05 weight percent. According to a twelfth implementation based on the tenth implementation, water for the aqueous based fluid has a salt concentration of about 0.05-3 weight percent. According to a thirteenth implementation based on the tenth implementation, water for the aqueous based fluid has a salt concentration of about 2-5 or 3-5 weight percent. According to a fourteenth implementation based on the tenth implementation, water for the aqueous based fluid has a salt concentration of about 3-28 or 5-28 weight percent.

Any combinations of the various embodiments and implementations disclosed herein can be used. These and other aspects and features can be appreciated from the following description of certain embodiments and the accompanying drawings and claims.

BRIEF DESCRIPTION OF THE DRAWINGS

The processes of the present disclosure will be described in more detail below and with reference to the attached drawings.

DETAILED DESCRIPTION OF CERTAIN EMBODIMENTS

Disclosed herein are methods and systems for reducing permeability of fractures in deep underground formations with the use of a thermal responsive fluid that transitions to a gel upon exposure to heat generated by one or more subsequently added exothermic reactants. Example implementations of these and other aspects are described with respect to the description and associated figures.

Figure 1:
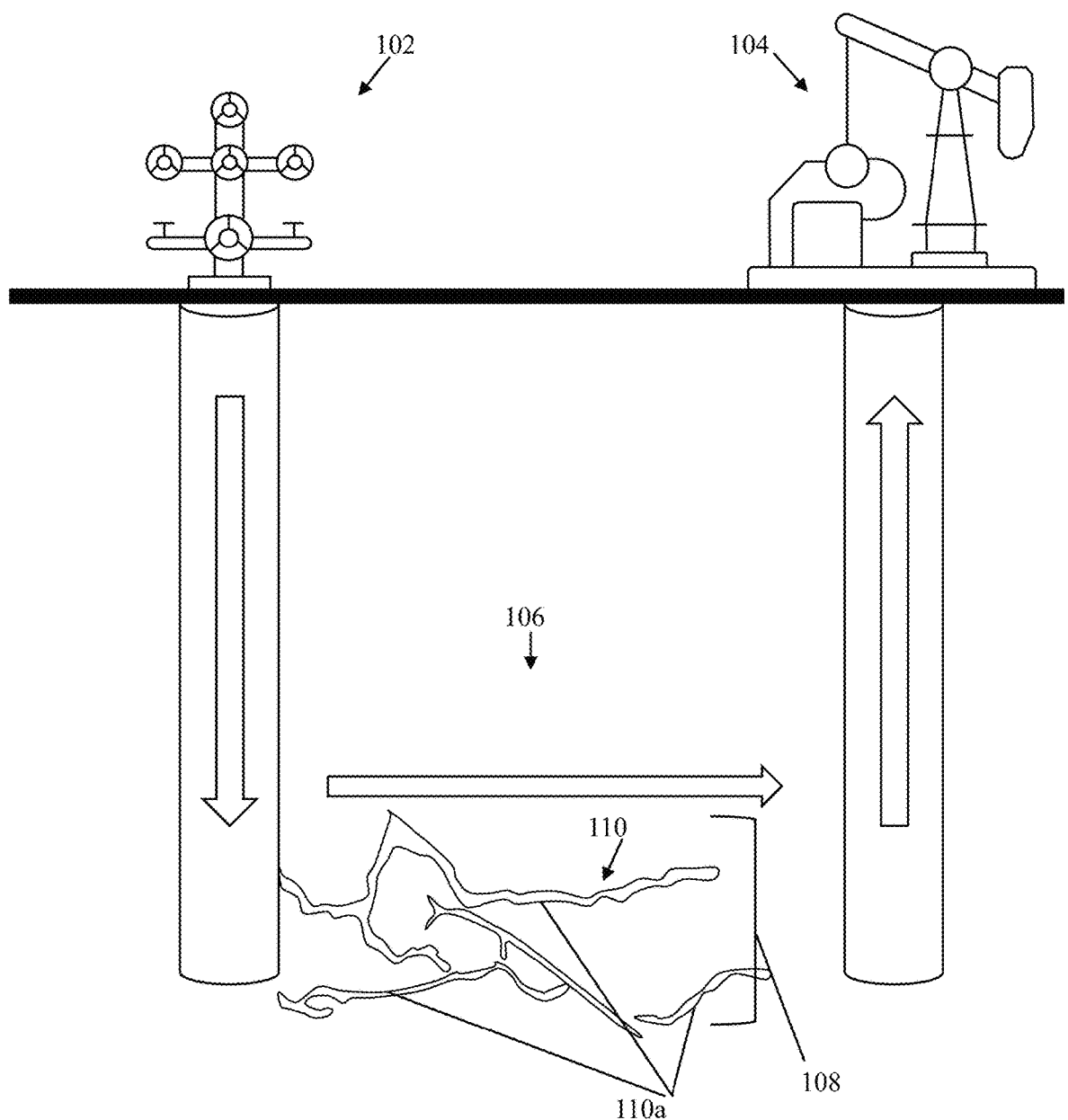
FIG. 1 is a schematic of subsystems of an injection/production system associated with the systems and methods for blocking fractures in a fracture zone herein.

FIG. 1 shows certain subsystems of an injection/production system 100, generally comprising an injection subsystem 102 and a production subsystem 104, which are both associated with an underground formation 106 including a hydrocarbon-containing matrix-rock reservoir, in a region shown generally as a targeted stratum 108. The targeted stratum 108 generally includes fractures 110, including interface regions of reservoir rock (e.g., sandstone) as a boundary between the producing fractures, and interface regions of reservoir rock as a boundary between the producing fractures and the boreholes (e.g., of the injection subsystem 102 and the production subsystem 104), known as the sand face(s).

The injection subsystem 102 and production subsystem 104 are known to those skilled in the art. For example, the injection subsystem 102 and the production subsystem 104, each generally comprise a wellbore and associated pumping and control apparatus. In certain modes of operation of the injection/production system 100, pressurized fluid is injected via the injection subsystem 102 to exert sweeping force on hydrocarbons within certain areas of the from hard-to-reach areas of the underground formation 106 and directing hydrocarbons within the matrix-rock reservoir to the producing well of the production subsystem 104. As depicted in FIG. 1, fractures 110 within the targeted stratum 108 are designated open fractures 110*a*, that is, absent injection of thermal responsive fluid carried out by the process herein.

The fractures 110, particularly in the open state 110*a*, are high permeability channels that exist within the matrix-rock reservoir. Existence of such high permeability fractures including open fractures may result in certain problems during injection/production processes, including well formation conformance issues during water flooding with poor sweep efficiency, leading to inaccessible pockets within with unrecoverable hydrocarbons. When injecting water into reservoirs, water conventionally will flow to a production wellbore through a path of least resistance to the regions with relatively higher permeability, including those with fractures (e.g., fractures 110*a*). Under such circumstances upswept hydrocarbons remain in regions with relatively lower permeability. Excessive water production is also related to conformance issues within a hydrocarbon bearing formation.

Multi-Step Treatment with Thermal Responsive Fluid and Exothermic Reactants

In the process herein, permeability of fracture-containing high permeability areas is decreased with a multi-step gel-based treatment to plug fractures in a targeted stratum. In the methods herein, and as described for instance in conjunction with FIGS. 2 and 3, permeability of fracture-containing high permeability areas in a targeted stratum is decreased to maximize efficacy of hydrocarbon production and/or minimize water production using a multi-step treatment with thermal responsive fluid and exothermic reactants.

Thermal Responsive Fluid Injection

Figure 2:
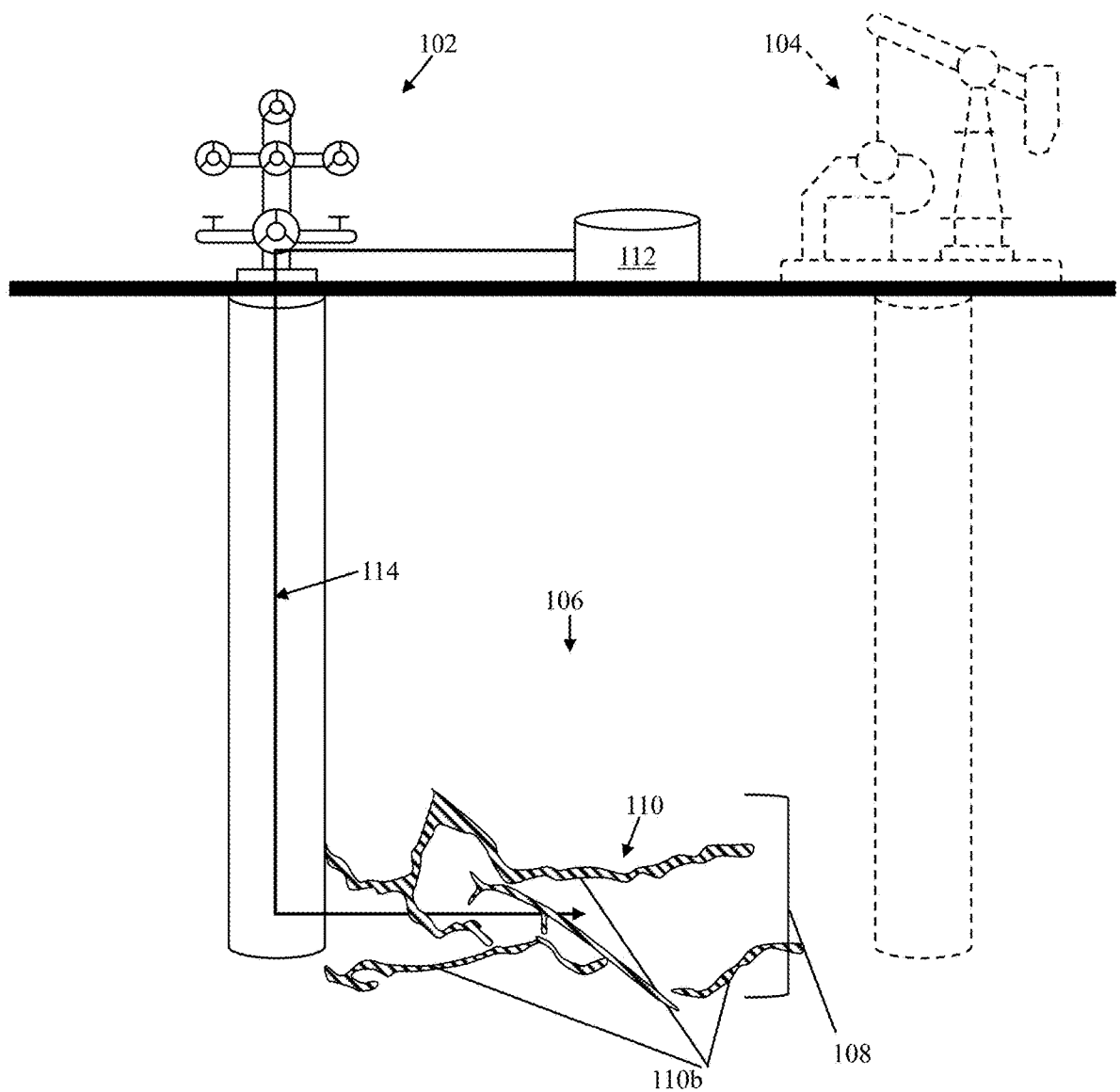
FIG. 2 is a schematic of a system for blocking fractures in a fracture zone herein depicting a step of thermal responsive fluid injection.

In certain example implementations and with reference to FIG. 2, a thermal responsive fluid from a source 112 via a suitable conduit such as coil tubing represented by line 114, is introduced into the fractures 110 that were in the open state. An amount of thermal responsive fluid is provided that is sufficient to fill the fractures 110 in an amount of about 50-250, 50-150, 50-100, 90-250, 90-150 or 90-100 volume percent relative to volume to be filled. An effective rate of injection can be determined, for example, based on concentration and heat value that will be provided to accelerate or deaccelerate the gelation time. In one or more embodiments, the introduction of the thermal responsive fluid can be conducted using conventional chemical injection methods that utilize mixer tanks to prepare the gel solution above ground prior to injection of the treatment fluid. In one or more embodiments, the thermal responsive fluid may be mixed using a mixer prior to introduction to ensure homogeneity of the composition. In some embodiments, the thermal responsive fluid may be mixed in the field using suitable mixing tanks capable of controlling the temperature thereof at the surface, to maintain a temperature that minimizes or prevents cross-linking until exposure to heat from the exothermic reaction. In certain embodiments, the thermal responsive fluid is introduced into the formation at an initial temperature of less than about 35, 30, 28, 26 or 24° C. In one or more embodiments, the thermal responsive fluid may be introduced into the formation by injecting at a pumping rate and pressure that is below a formation parting pressure. In addition, high injection rates can yield shear degradation. If necessary, low shear valves can be used to minimize such degradation.

The thermal responsive fluid is introduced by injecting at one or more locations that are proximate to within the fractures 110, and/or that are proximate to or within the targeted stratum 108. In certain example implementations the coil tubing for introducing thermal responsive fluid is positioned, configured and dimensioned to inject the thermal responsive fluid at one or more locations that are within the fractures 110. In certain example implementations the coil tubing for introducing thermal responsive fluid is positioned, configured and dimensioned to inject the thermal responsive fluid at one or more locations that are proximate to the fractures 110, for example within the underground formation 106 proximate to or within the sand face so as to permeate to the formation openings, and wherein the fluid permeates to the fractures 110. In certain implementations the coil tubing for introducing thermal responsive fluid is positioned, configured and dimensioned to inject the thermal responsive fluid at the fractures 110, or at a suitable distance from the fractures 110, for example in the range of about 0-10, 0-5, 0-1, 0-0.5, 0.1-10, 0.1-5, 0.1-1, or 0.1-0.5 meters.

As a result of any of the above implementations, the fractures 110 that were previously in the open state 110*a* and of high permeability are transformed to fractures 110*b* that contain thermal responsive fluid. In certain implementations, some degree of gelation of the thermal responsive fluid occurs at this stage, that is, prior to exothermic reaction to induce further gelation.

Exothermic Reactant Injection

Subsequently, after sufficient time for propagation of the gel composition in the fractures such as about a 0.1-10, 0.5-10, 0.8-10, 1-10, 0.1-5, 0.5-5, 0.8-5 or 1-5 hours, one or more compositions are introduced proximate to the fractures 110, that is, the fractures 110*b* that contain thermal responsive fluid, resulting in exothermal reaction to raise the temperature. For example, the amount and location of the exothermic reactant(s) are effective to increase the temperature to a target temperature in the range of about 60-300 or 70-300° C., causing gelation and resulting in plugged or partially plugged fractures 110*c*.

Figure 3:
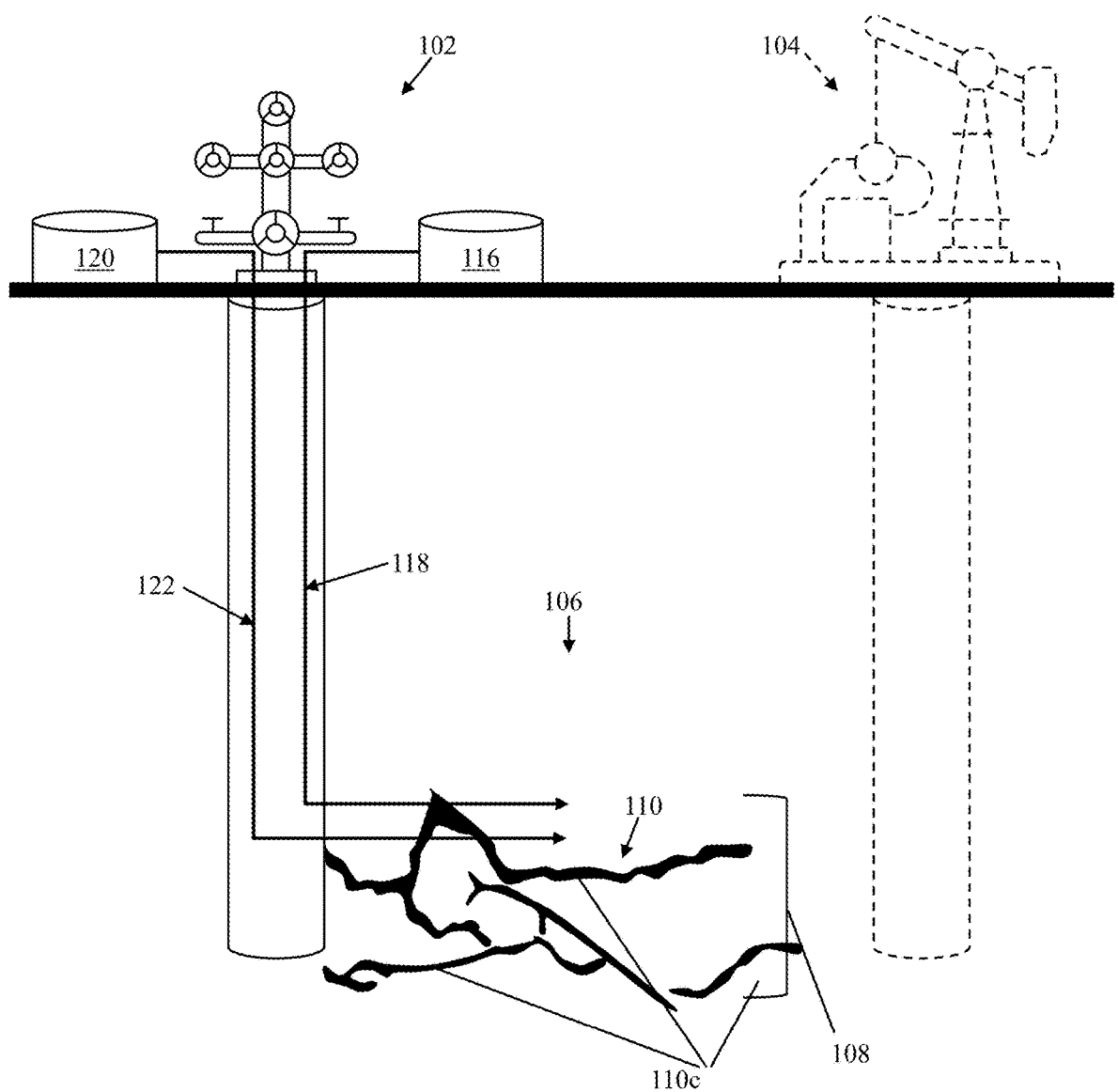
FIG. 3 is a schematic of a system for blocking fractures in a fracture zone herein depicting a step of exothermic reactant injection.

In certain example implementations, and with reference to FIG. 3, a first introduced exothermic reactant composition is provided from a first source 116 via a suitable conduit such as coil tubing represented by line 118, and a second introduced exothermic reactant composition is provided from a second source 120 via a suitable conduit such as coil tubing represented by line 122. In one or more embodiments, the introduction of the exothermic reactants can be conducted using conventional chemical injection methods that utilize mixer tanks to prepare the exothermic reactants above ground prior to their injection. In one or more embodiments, the introduction of the exothermic reactants can be conducted substantially simultaneously. In one or more embodiments, the introduction of the exothermic reactants can be conducted sequentially.

The first and second exothermic reactant compositions are introduced at or proximate to a sand face, which is adjacent to the gel-containing fractures 110*b*. The first and second exothermic reactant are injected at different locations and in a direction so as to permeate through the formation and exothermically react with one another. The resulting heat generated by the exothermic reaction is conducted into and/or around the gel-containing fractures 110*b*. In one or more embodiments, the locations at which the first exothermic reactant composition and the second injected exothermic reactant composition are introduced, e.g., injected or discharged from the coil tubing, are sufficiently close to one another to enable permeation through the formation to contact one another and cause the exothermic reaction; for example, a suitable distance between injections can be in the range of about 0.1-10, 0.1-5, 0.1-1, or 0.1-0.5 meters. In one or more embodiments, the point of contact and resulting exothermic reaction is sufficiently close to the gel-containing fractures 110*b* to enable heat conductivity, for example, at the fractures 110*b*, or at a suitable distance from the fractures 110*b*, for example in the range of about 0-10, 0-5, 0-1, 0-0.5, 0.1-10, 0.1-5, 0.1-1, or 0.1-0.5 meters.

In certain example implementations the coil tubing is positioned, configured and dimensioned to inject the first exothermic reactant composition at one or more first locations that are within the targeted stratum 108, and to inject the second exothermic reactant composition at one or more second locations that are within the targeted stratum 108, and wherein the exothermic reactant compositions permeate and exothermically react and conducts heat into and/or around the gel-containing fractures 110*b* within the targeted stratum 108 and form plugged or partially plugged fractures 110*c*. In certain example implementations the coil tubing is positioned, configured and dimensioned to inject the first exothermic reactant composition at one or more first locations that are outside the targeted stratum 108, and to inject the second exothermic reactant composition at one or more second locations that are outside the targeted stratum 108, and wherein the exothermic reactant compositions permeate and exothermically react and conducts heat into and/or around the gel-containing fractures 110*b* within the targeted stratum 108 and form plugged or partially plugged fractures 110*c*. In certain example implementations the coil tubing is positioned, configured and dimensioned to inject the first exothermic reactant composition at one or more first locations that are outside the targeted stratum 108, and to inject the second exothermic reactant composition at one or more second locations that are within the targeted stratum 108, wherein the exothermic reactant compositions permeate and exothermically react and conducts heat into and/or around the gel-containing fractures 110*b* within the targeted stratum 108 and form plugged or partially plugged fractures 110*c*. In certain example implementations the coil tubing is positioned, configured and dimensioned to inject the first exothermic reactant composition at one or more first locations that are within the targeted stratum 108, and to inject the second exothermic reactant composition at one or more second locations that are outside the targeted stratum 108, wherein the exothermic reactant compositions permeate and exothermically react and conducts heat into and/or around the gel-containing fractures 110*b* within the targeted stratum 108 and form plugged or partially plugged fractures 110*c*.

In certain embodiments, exothermic reaction of the injected first and second exothermic reactant compositions is catalyzed by combining the reactants at a suitable catalyzing pH level. A pH modifier can be included with the first exothermic reactant composition, the second exothermic reactant composition, or both the first exothermic reactant composition and the second exothermic reactant composition, to attain a catalyzing pH level to promote reaction between the first and second injected exothermic reactant compositions. In certain embodiments (not shown), a pH modifier is added in a separate step, through the same or different tubing to attain a catalyzing pH level and promote reaction between the first and second injected exothermic reactant compositions. When an acid is added the pH is reduced, which reduced the requisite pressure to promote reaction between the first and second injected exothermic reactant compositions. For example, at a pH of 4, the reaction will take place even at ambient temperature.

In certain embodiments, exothermic reaction of the first and second injected exothermic reactant compositions is catalyzed by combining the reactants at a suitable catalyzing temperature. In certain embodiments, one or both of the first and second injected exothermic reactant compositions are provided at a temperature that is effective to attain a catalyzing temperature and promote reaction therebetween. For example, one or both of the first or second injected exothermic reactant compositions are provided at a temperature in the range of about 60-90, 60-80 or 60-70° C.

Formation

In certain embodiments of the above implementations the underground formation 106 is, or contains, one or more regions or targeted stratum 108 with fractures 110. In certain embodiments of the above implementations the underground formation 106 corresponds a subterranean formation characterized by stratum of permeability that is detrimental to hydrocarbon production and/or results in excessive water formation. In certain embodiments of the above implementations the targeted stratum 108 with fractures 110 corresponds to a subterranean formation at depths ranging from a lower limit of any of about 200, 300, 500 or 1000 meters, to an upper limit of any of about 2500, 3000, 3050, 3500 or 4000 meters, in which any lower limit can be used in combination with any mathematically-compatible upper limit. In certain embodiments of the above implementations the targeted stratum 108 with fractures 110 corresponds to a subterranean formation at depths ranging from about 200-4000 or 300-3050 meters. In certain embodiments of the above implementations the targeted stratum 108 with fractures 110 corresponds to a subterranean formation that is characterized by a temperature ranging from a lower limit of any of about 20, 30, 40, 50, 60 or 70° C., to an upper limit of any of about 60, 70, 80, 90 or 100° C., in which any lower limit can be used in combination with any mathematically-compatible upper limit. In certain embodiments of the above implementations the targeted stratum 108 with fractures 110 corresponds to a subterranean formation that is characterized by a temperature in the range of about 20-100, 20-90 60-100, 60-90, or 20-60° C. In certain implementations the targeted stratum with fractures 110 corresponds to a subterranean formation that is at a distance from a production wellbore associated with the targeted stratum, such as at least about 0-50, 1-50, 10-50, 0-25, 1-25 or 10-25 meters, for example, which corresponds to the sand face.

In one or more implementations, the targeted stratum 108 with fractures 110 corresponds to areas or channels of high permeability. For example, high permeability as a relative property may refer to areas can range from 2 times and above. For example, a reference zone with plural channels may include those characterized by permeability of about X millidarcy (mD), wherein X can be about 1-20, others characterized by permeability of 2-500 X are referred to as areas or channels of high permeability. The fractures in which gel treatments herein are carried out including gelation induced by exothermic reaction permits diversion of fluid flow from water channels to formation matrix. Fluids tend to flow from high permeability and low oil saturation zones and will normally bypass low permeability zones with high oil saturation. Treatments as described in one or more embodiments herein can alter this behavior, and enhance oil production by improving flood sweep efficiency.

Thermal Responsive Fluid

In one or more implementations a thermal responsive fluid comprises an aqueous based fluid and a natural extract of sago-containing plants. In one or more implementations a thermal responsive fluid comprises an aqueous based fluid, one or more salts and a natural extract of sago-containing plants. In one or more implementations a thermal responsive fluid consists essentially of an aqueous based fluid and a natural extract of sago-containing plants. In one or more implementations a thermal responsive fluid consists essentially of an aqueous based fluid, one or more salts and a natural extract of sago-containing plants. In certain embodiments of the above implementations of a thermal responsive fluid, the aqueous based fluid comprises water including freshwater, well water, filtered water, distilled water, sea water, salt water, produced water, formation brine, other type of water, or combinations of waters. In certain embodiments of the above implementations of a thermal responsive fluid, the aqueous based fluid comprises salt-containing water. In certain embodiments of the above implementations of a thermal responsive fluid, the aqueous based fluid comprises water having a salt concentration of 0 up to about 0.05 weight percent, including freshwater, well water, filtered water, distilled water, other type of water, or combinations of waters containing less than about 0.05 weight percent salt. In certain embodiments of the above implementations of a thermal responsive fluid, the aqueous based fluid comprises brackish water, for example a salt-containing water having a salt concentration in the range of about 0.05-3 weight percent. In certain embodiments of the above implementations of a thermal responsive fluid, the aqueous based fluid comprises saline water, for example a salt-containing water having a salt concentration in the range of about 2-5 or 3-5 weight percent. In certain embodiments of the above implementations of a thermal responsive fluid, the aqueous based fluid comprises brine water, for example a salt-containing water having a salt concentration in the range of about 3 or 5 weight percent, up to the solubility limit, for example about 25-28 weight percent. The salt-containing water may be prepared by adding one or more salts to fresh water, or may be obtained from sea water, brackish water, salt-containing produced water and/or salt-containing formation water. The salts may include, but are not limited to, alkali metal and alkaline earth metal halides and hydroxides. In one or more embodiments, brines may be any of seawater, aqueous solutions wherein the salt concentration is less than that of seawater, or aqueous solutions wherein the salt concentration is greater than that of seawater. Salts that are found in seawater may include barium, sodium, calcium, aluminum, magnesium, potassium, strontium, and lithium salts of halides, carbonates, sulfates, chlorates, bromates, nitrates, oxides, phosphates, among others. Any of the aforementioned salts may be included in brine. In one or more embodiments, the density of the aqueous fluid may be controlled by increasing the salt concentration in the brine, though the maximum concentration is determined by the solubility of the salt. In one or more embodiments, brine may include an alkali metal halide or carboxylate salts and/or alkaline earth metal carboxylate salts. In one or more embodiments, brine may include high salinity brine, for example, about 50,000-100,000 or 50,000-70,000 ppm, wherein the salt is selected from the group consisting of NaCl, MgCl, CaCl, NaSO$_4$, NaHCO$_3$ and combinations of two or more of the foregoing salts. In certain embodiments, brine may include high salinity brine, for example, about 50,000-100,000 or 50,000-70,000 ppm, wherein the salt includes two, three, four or all of NaCl, MgCl, CaCl, NaSO$_4$, NaHCO$_3$.

The thermal responsive fluid of one or more embodiments herein may contain materials to provide various characteristics and properties to the fluid. The thermal responsive fluid may contain one or more viscosifiers or suspending agents in addition to the sago based polymer, weighting agents, proppants, corrosion inhibitors, soluble salts, biocides, fungicides, seepage loss control additives, bridging agents, deflocculants, lubricity additives, shale control additives, pH control additives, and other additives as necessary. In one or more embodiments, the thermal responsive fluid can also contain one or more materials that function as encapsulating or fluid loss control additives.

The extract containing sago biopolymer may be of certain sago-containing plants including one or more of palm, cycad or cassava. For example, the natural extract may be extracted from sago-containing plants including tropical palms, *cycas revoluta, metroxylon* sagu, or cassava, for example, from the pith of stems of such sago-containing plants. In terms of its composition, the natural extract is a water-based mixture of natural components including a natural sago biopolymer component, and other natural components in the extract from sago-containing plants including sago protein, sago fat, sago fiber or combinations thereof, including any two of sago protein, sago fat or sago fiber, or each of sago protein, sago fat and sago fiber. The sago biopolymer component can be very rich in sago starch, a polysaccharide. Beneficially, sago-containing plants are abundant in nature, and as such, represent agricultural commodities that are produced in mass for large-scale use, primarily within agricultural industries.

A sago thermal responsive fluid in accordance with one or more implementations including natural extract of sago-containing plants contains both a cross-linker and a biopolymer. Additionally, without being limited to any particular theory, the presence of fiber in the thermal responsive fluid may contribute to the improvement in the resulting gelant properties thereof. Sago fiber materials can be mixed with an aqueous solution including one or more salts, or a brine, at varying concentrations depending on the specific use of treatment fluid. In one or more embodiments, the solution including the sago fiber materials may be mixed using a mixer. In some embodiments, the treatment fluid may be mixed in the field using suitable mixing tanks capable of controlling the temperature of the treatment fluid at the surface. In one or more embodiments, the sago product may be mixed using a mixer prior to injection to ensure homogeneity of the composition. In some embodiments, the sago product may be mixed in the field using suitable mixing tanks capable of controlling the temperature of the treatment fluid at the surface, to maintain a temperature that minimizes or prevents cross-linking.

In one or more embodiments, the thermal responsive fluid comprises an effective amount of a natural extract of sago-containing plants. The effective amount of a natural extract of sago-containing plants in the thermal responsive fluid can be about 0.1-10 weight percent relative to the weight of the thermal responsive fluid. For example, the thermal responsive fluid may contain a natural extract of sago-containing plants in an amount ranging from a lower limit of any of about 0.1, 1, 2, 3, 3.5, 4, 4.5 and 5 weight percent relative to the weight of the thermal responsive fluid, ppm to an upper limit of any of about 4, 4.5, 5, 5.5, 6, 7, 8, 9 or 10 weight percent relative to the weight of the thermal responsive fluid, in which any lower limit can be used in combination with any mathematically-compatible upper limit. By modifying the amount of the natural extract of sago-containing plants, the resulting properties of the thermal responsive fluid can be tailored to select specific viscosities and gel hardness or softness. In addition, modifying the amount of the natural extract of sago-containing plants can tailor a temperature or temperature range at which desired rates of gelation of the sago within the thermal responsive fluid are attained. In one or more embodiments, when the formation treatment fluid contains sago in amount less than 50,000 ppm, a more viscous gelled fluid may be formed with moderate flow-ability.

In one or more embodiments the gelation time of the modified aqueous formation treatment fluid may be tailored by controlling the concentration of the sago component in the treatment fluid to tailor the temperature at which gelation occurs. When subjected to elevated temperatures, for example, at about 90° C., the gelation time may be about 1 hour at sago concentrations greater than about 7 weight percent, the gelation time may be about 1.5 hour at sago concentrations ranging from about 4-7 weight percent, and the gelation time may be about 2 hours at sago concentrations of less than about 4 weight percent. In certain implementations of the methods herein, gelation can occur at increased rates even at lower initial temperature at the target stratum. For example, in implementations in which the target stratum is initially at a temperature of about 60° C., addition of the exothermic reactants serves to raise the temperature surrounding the sago-containing fractures, for example, to about 70-300, 70-200, 70-150, 70-120, 90-300, 90-200, 90-150 or 90-120° C.

The thermal treatment fluid is characterized by a suitable viscosity and is provided in sufficient quantity so that a sufficient amount remains in the fractures, shown as gel-containing fractures 110b in FIG. 2. For example, a viscosity range between about 10-100 or 10-90 cP at 100° C. may be suitable, or another value described herein at other temperatures. In one or more embodiments the thermal responsive fluid in an aqueous base fluid, optionally including one or more salts, that has a viscosity similar to that of water. A water-like viscosity may allow the solution to effectively penetrate voids, small pores, and crevices, such as encountered in fine sands, coarse silts, and other formations. In some embodiments, the viscosity of the thermally treated fluid may be varied to obtain a desired degree blockage for decreasing the flow of water through or increasing the load-bearing capacity of a formation. The viscosity of the solution increases with the application of temperatures above ambient conditions using exothermal reactants, for example based on an activating temperature of the thermal responsive fluid, to form a gel or more viscous material that serves to block or partially block the targeted fractures.

The desired viscosity of the resulting material, for example shown in FIG. 3 as plugged or partially plugged fractures 110c may be case dependent, and specific to the particular application of use. In general, the thermal responsive fluid may be tailored to provide a sufficient increase in viscosity (of about two orders of magnitude compared to conventional injection fluids, e.g. water) as required to affect any diversion of treatment fluid. For example, in one or more embodiments, at sago concentrations below about 5 weight percent, the resulting thermal responsive fluid may maintain a fluid form with an initial viscosity (prior to gelation) at 25° C. in the range of about 20 to 100 cP, a viscosity at 40° C. that is of the range of about 10 to 85 cP, a viscosity at 60° C. in the range of about 5 to 60 cP, and a viscosity at 90° C. in the range of about 1 to 40 cP. Additionally, for example, the thermal responsive fluid may have a viscosity at 90° C. that in an amount ranging from a lower limit of any of about 1, 3, 5, and 10 cP to an upper limit of any of about 15, 20, 25, and 30 cP, where any lower limit can be used in combination with any mathematically-compatible upper limit. The concentration and temperature of the fluid may affect or alter the measured viscosity of the thermal responsive fluid.

In one or more embodiments, the thermal responsive fluid may have a pH ranging from about 3, 4, 4.5, 5, 5.5, 6, 6.5, 7, 7.5, 8, 8.5, 9, 9.5, and 10 to about 6, 6.5, 7, 7.5, 8, 8.5, 9, 9.5, 10, 10.5 and 11, where any lower limit may be combined with any mathematically feasible upper limit.

Exothermic Reactant(s)

In one or more implementations, the exothermic reactants comprise a first exothermic reactant and a second exothermic reactant, wherein the exothermic reactants undergo exothermic reaction. In one or more implementations, for example, as shown with respect to FIG. 3, a first salt solution comprises the first injected exothermic reactant composition from source 116, and a corresponding second salt solution comprises the second injected exothermic reactant composition from source 120. In one or more embodiments, each of the exothermic reactant(s) may have the same or different a pH ranging from about 3, 4, 4.5, 5, 5.5, 6, 6.5, 7, 7.5, 8, 8.5, 9, 9.5, and 10 to about 6, 6.5, 7, 7.5, 8, 8.5, 9, 9.5, 10, 10.5 and 11, where any lower limit may be combined with any mathematically feasible upper limit.

In one embodiment, a first salt comprises ammonium chloride ($NH_4Cl$) and a second salt comprises sodium nitrite ($NaNO_2$). In one embodiment, a catalyzing pH for exothermic reaction of ammonium chloride and sodium nitrite is greater than about 4. In one embodiment, a catalyzing temperature for exothermic reaction of ammonium chloride and sodium nitrite is greater than about 60° C. Equation (1) shows the reaction, whereby ($\Delta HRx=-79.95$ kcal $mol^{-1}$, irreversible $K_{eq}=3.9\times10^{71}$ Paxmole $m^{-3}$ at 25° C.).

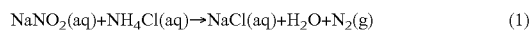

$$NaNO_2(aq)+NH_4Cl(aq)\rightarrow NaCl(aq)+H_2O+N_2(g) \quad (1)$$

Figure 4:
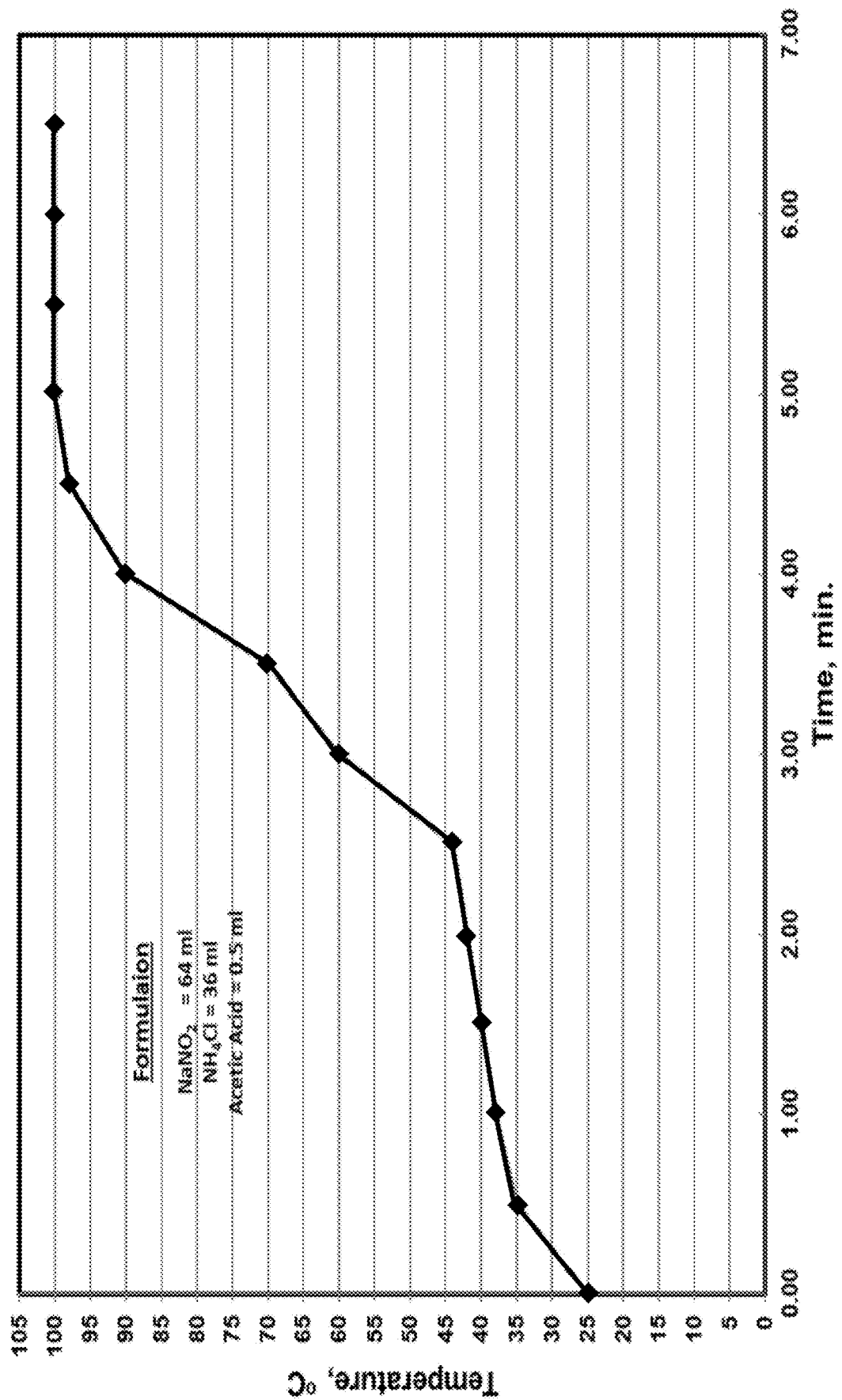
FIG. 4 is a plot of temperature as a function of time according to an example herein.

The amount of heat generated by the reaction of equation (1) is affected by, for example, temperature, acidity, concentration of the first salt and/or concentration of the second salt. FIG. 4 shows the temperature increase resulting from reaction of equation (1).

Advantages

According to one or more implementations herein, exothermic reaction is utilized to control the temperature at the targeted stratum to and affect the gelation time and gel propagation in the porous medium. According to one or more implementations herein, the amount of heat generated from the exothermic reaction can be designed and/or adjusted based on the initial reaction temperature, acidity, and concentration of one or both exothermic reactants.

According to one or more implementations herein, it is possible to reduce permeation in low temperature reservoirs, where a typical sago bio-polymer solution requires higher ambient temperature in order to realize higher gelation rates.

Due to the existing reservoir heterogeneity, one or more implementations herein improves the sweep efficiency during waterflooding processes by diverting the flow from the high permeability zones to the lower once and, consequently, enhancing oil recovery.

According to one or more implementations herein, it advantages are provided relative to chemical treatments that utilize gelants formed of two different chemical components (i.e., a polymer and a cross-linker). The complexity and nature of conventional gelant compositions increases the logistical burden and associated costs. Moreover, the two components of conventional gel-based solutions need to be mixed at certain concentrations to provide the required gel setting time and strength to achieve the necessary shutoff effect. Such mixing adds a further burden to the technology deployment at the well site.

Example 1

Three solutions of different concentration of *Cycas revoluta* sago, 0.1, 1 and 2.5 weight percent, were prepared in high salinity brine (57,000 ppm) containing NaCl, MgCl, CaCl, $NaSO_4$ and $NaHCO_3$. Viscosity as a function of temperature (FIG. 5) and time (FIG. 6) was ascertained.

Figure 5:
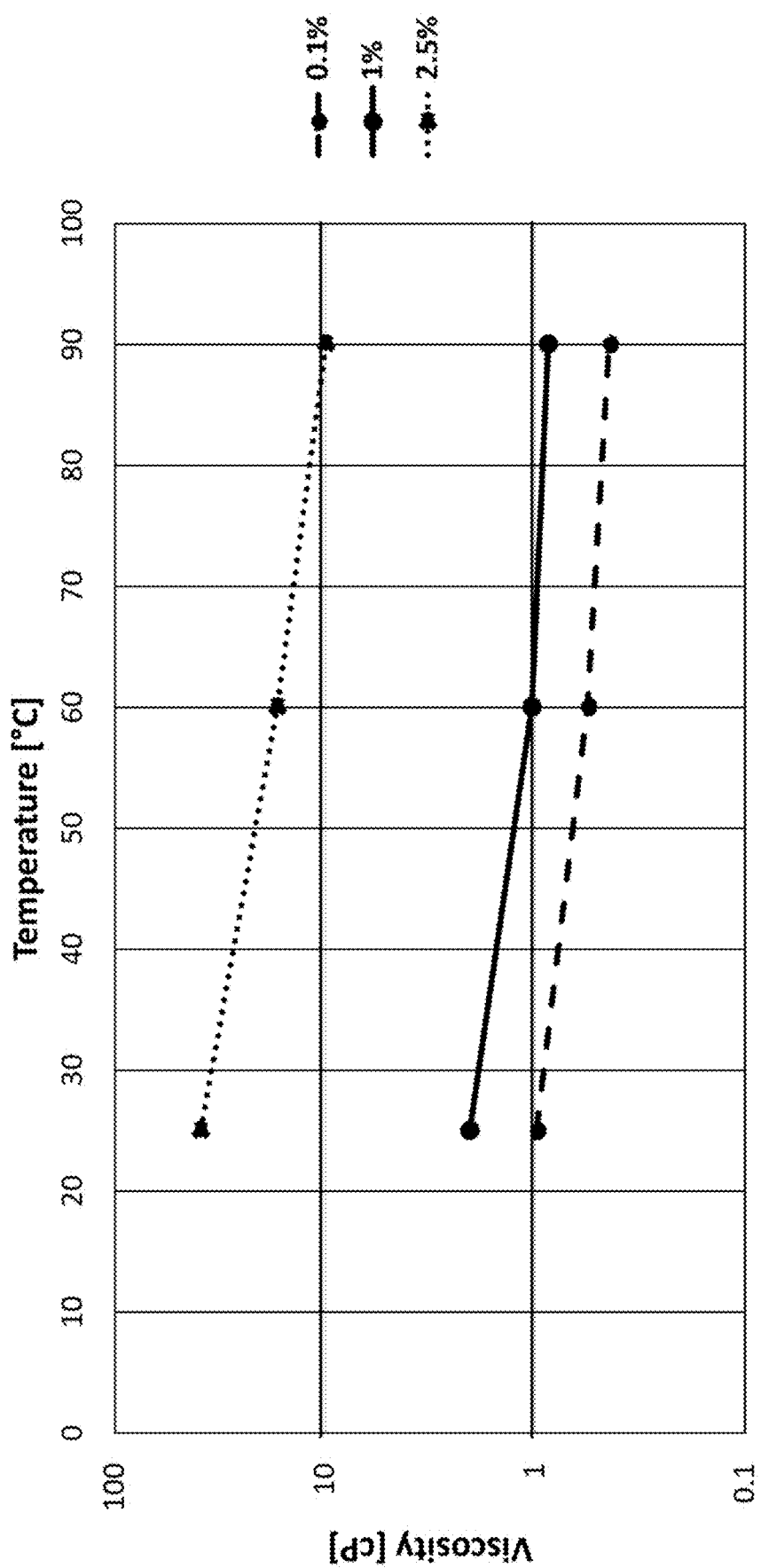
FIG. 5 is a plot of viscosity as a function of temperature for the formulation according to an example herein.

FIG. 5 shows viscosity (centipoise, logarithmic scale) plotted as a function of temperature (° C.) for the three solutions. The viscosity of the solutions at 25, 60, and 90° C. was determined, wherein the viscosity values at 25° C. were 1, 2, and 39 centipoise; the viscosity values at 60° C. were 0.56, 1.04, and 16.9 centipoise, and the viscosity values at 90° C. were 0.44, 0.86, and 9.9 cP; each at the concentrations of 0.1, 1, and 2.5 weight percent %.

Figure 6:
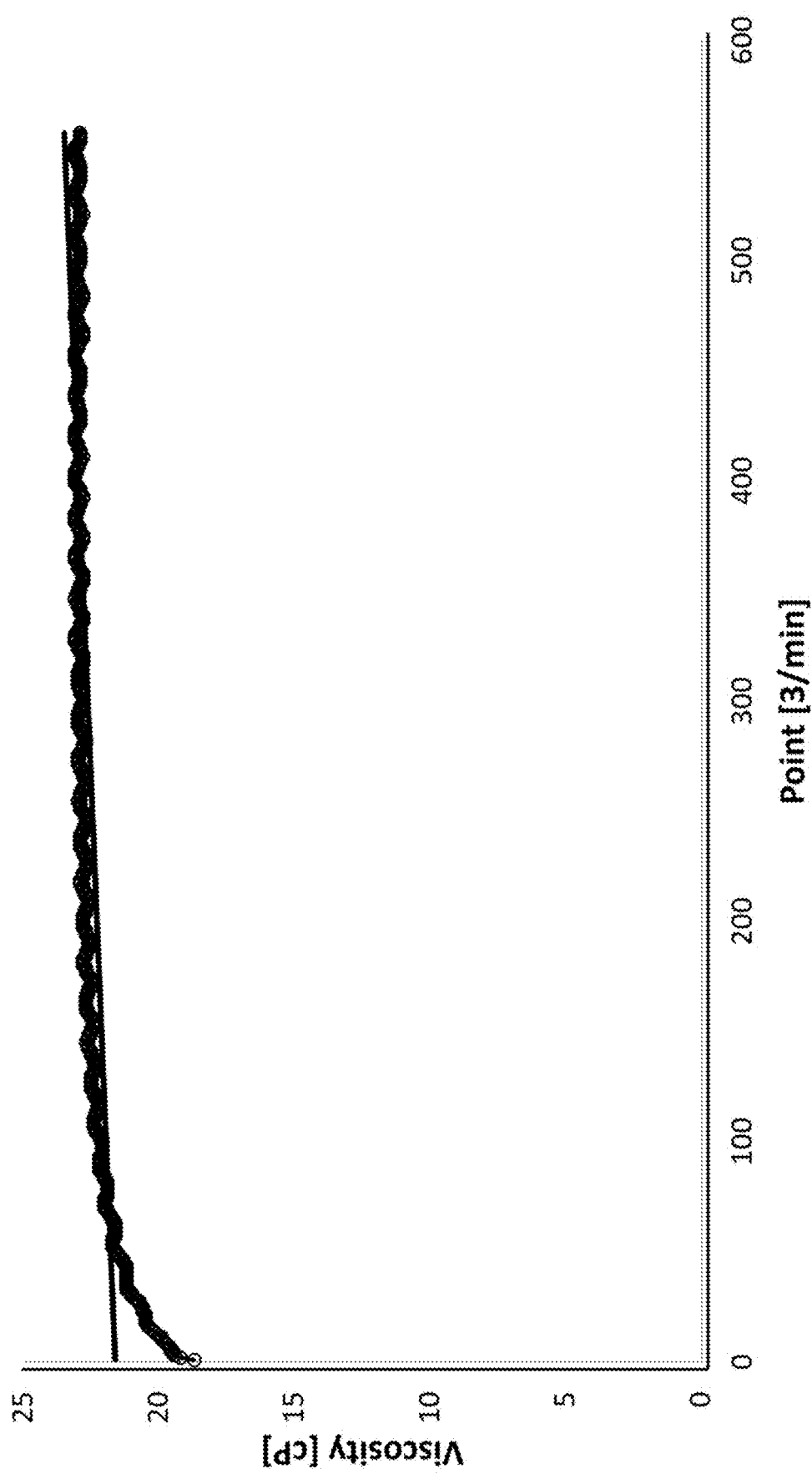
FIG. 6 is a plot of viscosity as a function of time for the formulation according to an example herein.

FIG. 6 shows viscosity (centipoise, logarithmic scale) plotted as a function of time (point, 3 per minute) at 90° C. for the 2.5 weight percent solution. This plot demonstrated an exponential trend where the viscosity started from about 19 centipoise and increased incrementally until it reached to about 22.5 centipoise.

Example 2

Figure 7A:
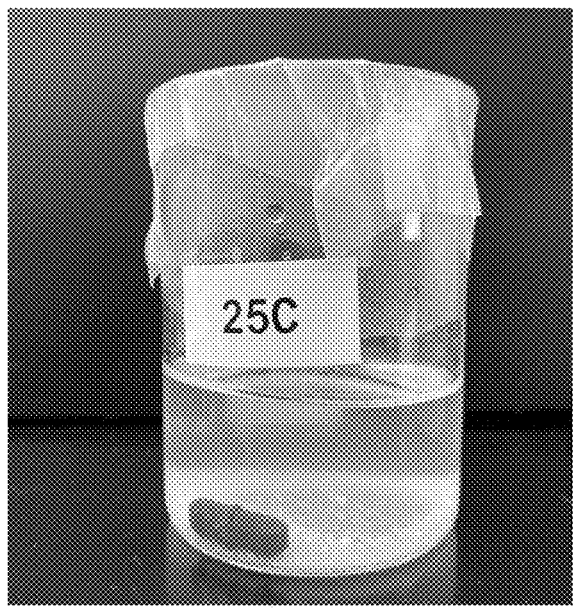
FIG. 7A, FIG. 7B and FIG. 7C show the mixing process of *Cycas revoluta* sago according to examples herein at different temperatures.
Figure 7B:
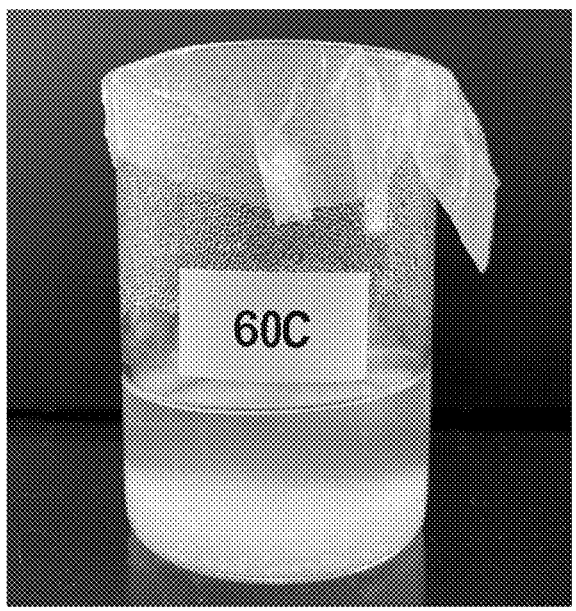
Figure 7C:
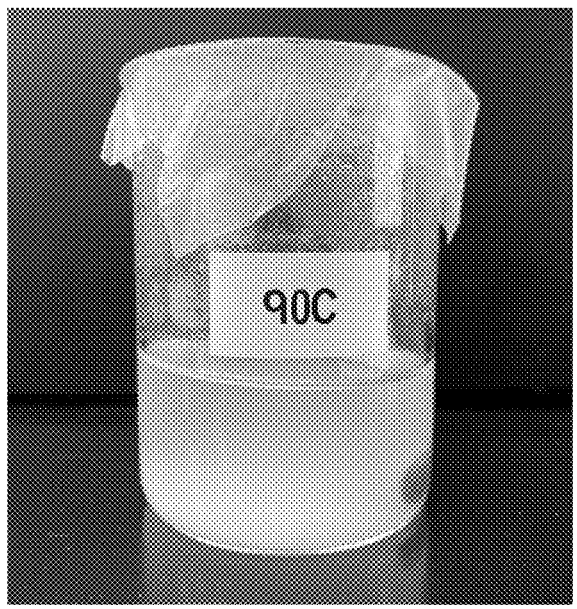

A 0.2 weight percent solution of *Cycas revoluta* sago was prepared and qualitatively analyzed at different temperatures. FIG. 7A, FIG. 7B and FIG. 7C show the mixing process of the 0.2 weight percent solution of *Cycas revoluta* sago in high salinity brine (57,000 ppm containing NaCl, MgCl, CaCl, $NaSO_4$ and $NaHCO_3$) after 1.5 hours, where the sago powder was totally insoluble at 25° C. (FIG. 7A), partially dissolved at 60° C. (FIG. 7B) and totally dissolved at 90° C. (FIG. 7C).

The terms "approximately" or "about" when used in conjunction with a numerical value in the present disclosure refers to any number within about 10, 5, 3 or 1% of the referenced numerical value, including the referenced numerical value.

It is to be understood that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings according to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

The invention claimed is:
1. A method for blocking fractures in a fracture zone including fractures and adjacent sand faces, comprising:
 introducing a thermal responsive fluid comprising a *Cycas revoluta* sago into fractures of the fracture zone;
 introducing exothermic reactants via separate conduits to sand faces adjacent to fractures having the thermal responsive fluid;
 mixing the exothermic reactants in the fracture zone at (a) a catalyzing temperature of at least about 60° C., and/or (b) a catalyzing pH of at least about 4,
 thereby catalyzing an exothermic reaction between exothermic reactants;
  wherein heat generated by the exothermic reaction between the exothermic reactants induces gelation of at least a portion of the *Cycas revoluta* sago within fractures of the fracture zone, thereby blocking the fractures.

2. The method of claim 1, wherein the thermal responsive fluid and the exothermic reactants are aqueous based.

3. The method as in claim 1, wherein the exothermic reactants comprise an ammonium chloride solution and a sodium nitrite solution.

4. The method as in claim 1, wherein the fractures are in high permeability channels.

5. The method as in claim 1, wherein the fracture zone comprises a low temperature reservoir and is characterized by a temperature in the range of about 20-100 °C.

6. The method as in claim 5, wherein the fracture zone is at depth of about 200-4000 meters.

7. The method as in claim 1, wherein the exothermic reactants are injected into an area of the fracture zone adjacent to an injection location of the thermal responsive fluid in the fracture zone.

8. The method as in claim 1, wherein mixing exothermic reactants in the fracture zone occurs at a catalyzing temperature of at least about 60° C.

9. The method as in claim 1, wherein mixing exothermic reactants in the fracture zone occurs at a catalyzing pH of at least about 4.

10. The method as in claim 1, wherein the thermal responsive fluid is aqueous based and has a sago concentration in the range of about 0.1-10 weight percent.

11. The method as in claim 10, wherein water for the aqueous based fluid has a salt concentration of 0 up to about 0.05 weight percent.

12. The method as in claim 10, wherein water for the aqueous based fluid has a salt concentration of about 0.05-3 weight percent.

13. The method as in claim 10, wherein water for the aqueous based fluid has a salt concentration of about 2-5 or 3-5 weight percent.

14. The method as in claim 10, wherein water for the aqueous based fluid has a salt concentration of about 3-28 or 5-28 weight percent.

15. The method as in claim 1, wherein
the fractures are in high permeability channels, and
the fracture zone comprises a low temperature reservoir and is characterized by a temperature in the range of about 20-60° C.

16. The method as in claim 15, wherein the fracture zone is at depth of about 200-4000.

17. The method of claim 1, wherein
the thermal responsive fluid and the exothermic reactants are aqueous based;
the exothermic reactants comprise an ammonium chloride solution and a sodium nitrite solution;
the fractures are in high permeability channels;
the fracture zone comprises a low temperature reservoir is characterized by a temperature in the range of about 20-60° C.;
the fracture zone is at depth of about 200-4000 meters;
the exothermic reactants are injected into an area of the fracture zone adjacent to an injection location of the thermal responsive fluid in the fracture zone;
mixing exothermic reactants in the fracture zone occurs at a catalyzing temperature of at least about 60° C. and at a catalyzing pH of at least about 4; and
the thermal responsive fluid is aqueous based and has a sago concentration in the range of about 0.1-10 weight percent.

* * * * *